US009771148B2

(12) United States Patent
Cox et al.

(10) Patent No.: US 9,771,148 B2
(45) Date of Patent: Sep. 26, 2017

(54) AIRPORT TERMINAL AIRCRAFT GATE TRAFFIC MANAGEMENT SYSTEM AND METHOD (71) Applicants: Joseph J. Cox, Portland, OR (US); Isaiah W. Cox, London (GB)

(72) Inventors: Joseph J. Cox, Portland, OR (US); Isaiah W. Cox, London (GB)

(73) Assignee: Borealis Technical Limited, Gibraltar (GI)

( * ) Notice: Subject to any disclaimer, the term of this patent is extended or adjusted under 35 U.S.C. 154(b) by 14 days.

(21) Appl. No.: 14/341,735

(22) Filed: Jul. 25, 2014

(65) Prior Publication Data

US 2015/0151834 A1    Jun. 4, 2015

(51) Int. Cl.
*B64C 25/40* (2006.01)
*B64F 1/305* (2006.01)
*B64F 1/315* (2006.01)
*B64F 5/00* (2017.01)
*G08G 5/06* (2006.01)
*B64F 1/00* (2006.01)

(52) U.S. Cl.
CPC .............. *B64C 25/405* (2013.01); *B64F 1/00* (2013.01); *B64F 1/305* (2013.01); *B64F 1/315* (2013.01); *G08G 5/065* (2013.01); *Y02T 50/823* (2013.01)

(58) Field of Classification Search
None
See application file for complete search history.

(56) References Cited

U.S. PATENT DOCUMENTS 3,040,674 A * 6/1962 Bolton ................. B64F 1/24
104/36
3,110,048 A * 11/1963 Bolton ................. B64F 1/305
14/71.5

(Continued)

FOREIGN PATENT DOCUMENTS

GB       2457144 A    8/2009

OTHER PUBLICATIONS

RStretton, Dowese National Flickr Post Jul. 3, 2013, 05:54 PM, Delta DC-8-61 at Dowse.*

(Continued)

*Primary Examiner* — Fadey Jabr
*Assistant Examiner* — Kevin P Mahne (57) ABSTRACT An airport terminal gate traffic management system is provided that maximizes efficiency and safety of passenger transfer and aircraft servicing and minimizes aircraft time parked at a terminal. Aircraft are driven forward into and out of gates by controllable landing gear wheel non-engine drive means and parked in a parallel or perpendicular orientation relative to the terminal that facilitates passenger transfer through a maximum number of aircraft doors. Passenger transfer and aircraft servicing may begin upon aircraft arrival using all available accessible aircraft doors. Departing aircraft may be turned by an unassisted pilot and driven forward with the controllable non-engine drive means to a takeoff runway. Airport terminal aircraft gate traffic is most effectively and efficiently managed when a significant number of aircraft using an airport are equipped with non-engine drive means controllable to move them into and out of a parking orientation optimal for passenger transfer.

11 Claims, 5 Drawing Sheets (56) References Cited

U.S. PATENT DOCUMENTS

| | | | |
|---|---|---|---|
| 3,184,772 A * | 5/1965 | Moore | B64F 1/3055 14/71.5 |
| 3,489,297 A | 1/1970 | McClain et al. | |
| 3,683,440 A * | 8/1972 | Xenakis | B64F 1/3055 14/71.5 |
| 3,724,015 A * | 4/1973 | Japes | B64F 1/305 104/71 |
| 3,910,264 A * | 10/1975 | Mahieu | B64F 1/315 182/115 |
| 4,218,034 A * | 8/1980 | Magill | B64F 1/00 244/114 R |
| 6,487,743 B1 * | 12/2002 | Nicoletti | B64F 1/305 14/71.3 |
| 6,657,334 B1 | 12/2003 | Edelson | |
| 6,741,175 B1 * | 5/2004 | Rauch | B61B 1/02 340/541 |
| 6,838,791 B2 | 1/2005 | Edelson | |
| 6,914,542 B2 | 7/2005 | Hutton | |
| 7,116,019 B2 | 10/2006 | Edelson | |
| 7,343,995 B2 * | 3/2008 | Fukuhara | B64F 1/00 180/167 |
| 7,445,178 B2 | 11/2008 | McCoskey et al. | |
| 7,469,858 B2 | 12/2008 | Edelson | |
| 7,891,609 B2 | 2/2011 | Cox | |
| 7,975,960 B2 | 7/2011 | Cox | |
| 8,109,463 B2 | 2/2012 | Cox | |
| 8,336,901 B2 * | 12/2012 | Andre | B62D 31/025 105/8.1 |
| 2004/0004158 A1 * | 1/2004 | Peterson | B64F 1/00 244/115 |
| 2004/0051000 A1 * | 3/2004 | Konya | B64F 1/305 244/114 R |
| 2004/0148716 A1 * | 8/2004 | Hutton | B64F 1/3055 14/71.5 |
| 2006/0065779 A1 * | 3/2006 | McCoskey | B64F 1/32 244/100 R |
| 2006/0273686 A1 | 12/2006 | Edelson et al. | |
| 2007/0040066 A1 * | 2/2007 | McCoskey | B64C 25/405 244/137.1 |
| 2007/0252037 A1 * | 11/2007 | Greaves | B64F 1/00 244/114 R |
| 2009/0261197 A1 * | 10/2009 | Cox | B64C 25/36 244/50 |

OTHER PUBLICATIONS

Flyer Talk Forum, post Sep. 26, 2013, No. 11, viewed Feb. 1, 2017 by examiner.*

* cited by examiner

AIRPORT TERMINAL AIRCRAFT GATE TRAFFIC MANAGEMENT SYSTEM AND METHOD

PRIORITY CLAIM

This application claims priority from International Application No. PCT/US2013/072508, filed 29 Nov. 30, 2013, now withdrawn, the disclosure of which is fully incorporated herein.

TECHNICAL FIELD

The present invention relates generally to the management of aircraft gate traffic at an airport terminal and specifically to a system that significantly increases the efficiency with which aircraft ground traffic at an airport may be managed to minimize the time required for aircraft arrivals, unloading and loading, servicing, departures, and other turnaround activities.

BACKGROUND OF THE INVENTION

As numbers of airline flights have increased to accommodate increasing numbers of air travelers, many of the world's airports, aerodromes, and air fields have experienced a concomitant increase in use that their terminals and other facilities were not designed to handle. In airports with high flight volume, terminal gate space for arriving aircraft to park, unload passengers and cargo, be serviced, and then load for departure is at a premium. As a result, delays are far too frequently the norm as aircraft must wait until cleared upon arrival to proceed to a gate or cleared for pushback to leave a gate at departure. To minimize delays and keep flights on schedule at a busy airport where there are large numbers of arriving aircraft, an airport must supply a large number of terminal parking spaces, at gates or other locations, as well as personnel and service vehicles to direct gate traffic and provide baggage transfer and other services. Similarly, a large number of departing aircraft requires an airport to supply a large number of pushback tugs and personnel to clear parking spaces at a terminal for arriving aircraft. Increasing the numbers of gates or parking locations at an airport might help to alleviate the situation. This potential solution, however, is likely to involve costly and time-consuming permitting and construction of airport facilities that few, if any, existing airports are presently able to undertake.

Most aircraft terminals use passenger loading bridges at gates that are spaced to provide and maintain the necessary clearance between the wingtips of designated kinds of aircraft that park at the gates to transfer passengers and baggage between arrival and departure. If the required clearance between an aircraft scheduled to arrive at a designated gate and the two aircraft parked at immediately adjacent gates is not available, the arriving aircraft cannot taxi to its designated gate until at least one of the other aircraft is pushed back from an adjacent gate. The resulting delay not only leaves passengers in the arriving aircraft sitting in the aircraft on the tarmac, possibly missing connecting flights, but also leaves departing passengers in the terminal waiting. This sort of delay can have a far-reaching domino effect that plays havoc with passengers' and airlines' schedules and can ultimately negatively impact airlines' service and profits. Even when aircraft do not use passenger loading bridges or jet bridges to transfer passengers between the aircraft and a terminal building, space to park the aircraft close to the terminal may not be available when needed, particularly if departing aircraft cannot be pushed back on schedule due to a range of constraints, including possible jet blast from incoming or departing aircraft.

Systems for alleviating aircraft parking at airport terminal gates to avoid delay and shorten turnaround time have been proposed. In U.S. Pat. No. 3,489,299, McClain et al, for example, describe a method and system for parking aircraft at crowded terminals that provides a ground level platform, which is elevated after an aircraft drives onto it so that the aircraft's wings overlap the wings of adjacent aircraft, allowing more aircraft to be parked at terminal gate areas than would otherwise be permitted. In U.S. Pat. No. 6,914,524, Hutton describes a method and system for improving aircraft gate parking at an airport that defines parking spaces at an airport terminal for aircraft of a known type and moves passenger loading bridges to accommodate the minimum clearance required for this type of aircraft. The positions of passenger loading bridges are adjusted as needed to accommodate aircraft arriving at defined parking spaces. A computer-based system with a database of information relating to aircraft arrival times and defined parking space availability in communication with bridge controllers is updated at selected intervals or during peak traffic periods to ensure that aircraft are parked efficiently. The McClain et al system, however, requires disruption of gate areas to construct the disclosed parking platform apparatus, which, once constructed, is likely to be rather unwieldy in operation. The Hutton system could help to alleviate airline or aircraft delays specifically due to parking challenges. Neither of the aforementioned systems, however, addresses other significant causes of airport terminal gate traffic delays, including the availability of tugs or tow vehicles and/or attachment equipment to push back departing aircraft.

Aircraft are currently parked at airport terminals and gates as described and shown in the aforementioned patents with the nose end of the aircraft pointed toward the terminal or gate so that the longest axis of the aircraft is substantially perpendicular to the terminal or gate. This parking orientation is used because an aircraft currently operates one or more of its engines to power aircraft ground travel from a landing location to a parking location. When an aircraft's engines are operating, jet blast and engine ingestion can compromise the safety of persons and ground equipment within the engine hazard area, especially near a gate or terminal where there are likely to be more persons and equipment, as well as other aircraft. When all aircraft are parked in the same nose-in orientation, the danger areas where engine ingestion or jet blast could occur when aircraft engines are operating are at least somewhat predictable. Other aircraft parking orientations besides the currently used nose-in orientation could allow more aircraft to park at gates, stands, or other parking areas near an airport terminal. For example, parking an aircraft with the longest axis of the aircraft body parallel to the terminal or at an angle relative to the terminal other than the perpendicular orientation currently used may actually allow more efficient use of terminal parking space resources. The present need to use aircraft engines to drive aircraft to terminal gates and other parking areas, however, prohibits the use of these aircraft parking orientations because of the risks of jet blast and engine ingestion dangers associated with aircraft engine operation to move an aircraft on the ground.

The use of a non-engine drive means, such as a motor, integrally mounted with an aircraft landing gear wheel to rotate the wheel and move the aircraft on the ground autonomously without reliance on the aircraft's main engines or tow vehicles has been proposed. U.S. Pat. No. 7,469,858 to Edelson; U.S. Pat. No. 7,891,609 to Cox; U.S. Pat. No. 7,975,960 to Cox; U.S. Pat. No. 8,109,463 to Cox et al; and British Patent No. 2457144, owned in common with the present invention, describe aircraft drive systems that use electric drive motors to power aircraft wheels and move an aircraft on the ground without reliance on aircraft main engines or external vehicles. U.S. Pat. No. 7,445,178 to McCoskey et al describes an aircraft ground movement system with electric nose wheel motors that work in concert with an external guidance system intended to move a taxiing aircraft. The drive means described in these patents can effectively move an aircraft autonomously during ground operations, but exploiting the capabilities of aircraft equipped with such drive means to manage airport terminal aircraft gate traffic and parking and to eliminate many of the causes affecting delays of departing and arriving aircraft while improving airport gate operations efficiency is not an objective of such systems.

A need exists for an airport, aerodrome, or air field terminal aircraft gate traffic management system that manages aircraft traffic to eliminate many of the causes for delays affecting departing and arriving aircraft gate traffic and enhances aircraft traffic flow and the efficiency of airport gate operations without the time and expense of designing and building new airports or significantly altering existing airport structures.

SUMMARY OF THE INVENTION

It is a primary object of the present invention, therefore, to provide an airport, aerodrome, or air field terminal aircraft gate traffic management system that eliminates many of the causes for delays affecting departing and arriving aircraft gate traffic and enhances traffic flow and the efficiency of airport gate operations with only minor modifications to existing airport structures.

It is another object of the present invention to provide an airport terminal aircraft gate traffic management system that effectively minimizes an aircraft's time at a terminal between arrival and departure both at terminal gates, stands, and parking spaces equipped with passenger loading bridges and at terminal gates, stands, and parking locations that are not equipped with these or other connecting structures where passengers must use stairs to enter and leave aircraft and walk on the tarmac to a terminal entrance.

It is another object of the present invention to provide an airport terminal aircraft gate traffic management system wherein aircraft can park parallel to a terminal without subjecting persons and equipment to the danger associated with jet blast and engine ingestion.

It is another object of the present invention to provide an airport terminal aircraft gate traffic management system that enables the smooth free flow of aircraft traffic into and out of terminal gates and aircraft parking spaces, thereby increasing terminal throughput without the time and costs needed for new terminal facilities.

It is an additional object of the present invention to provide an airport terminal aircraft gate traffic management system that includes terminal gates with flexibly movable passenger loading bridges or jet bridges that can be moved manually or automatically as needed to maximize the space available for aircraft to park, turn in place, and leave the gate.

It is an additional object of the present invention to provide an airport terminal aircraft gate traffic management system that facilitates a parked aircraft's connection to baggage and/or cargo handling equipment without any significant facilities changes.

It is yet another object of the present invention to provide an airport terminal aircraft gate traffic management system that reduces the number of aircraft service and ground operations personnel and vehicles required during aircraft gate operations and turnaround.

It is yet an additional object of the present invention to provide an airport terminal aircraft gate traffic management system that facilitates the simultaneous unloading of arriving passengers and loading of departing passengers in aircraft equipped with multiple passenger exits and entrances.

It is yet a further object of the present invention to provide an airport terminal aircraft gate traffic management system that enables an airport terminal to eliminate pop-up servicing systems and provide fixed gate and/or stand aircraft servicing installations that may be extendable to reach parked aircraft and retractable to provide maximal maneuvering space for turning aircraft to leave a gate or stand.

It a still further object of the present invention to provide an airport terminal aircraft gate traffic management system that permits location of passenger-related facilities and/or aircraft service-related facilities on a designated selected side of an aircraft toward or away from a terminal.

It is still another object of the present invention to provide an airport terminal aircraft gate traffic management system that includes passenger walkways between parked aircraft and a terminal building designed to facilitate passenger transit between the aircraft and the terminal building using existing facilities with minimum modification.

It is still another object of the present invention to provide an automated airport terminal aircraft gate traffic management system that facilitates efficient aircraft traffic flow and terminal throughput.

It is a still further object of the present invention to provide an airport terminal aircraft gate traffic management system that enables an aircraft pilot to drive an aircraft out of a parking space as soon as cleared from ground interference without currently required formal approval.

It is a still further object of the present invention to provide an airport terminal aircraft gate traffic management system that enables an aircraft pilot to maneuver an aircraft into and out of a gate or other parking space by driving the aircraft only in a forward direction without the hazards presented by jet blast or engine ingestion.

It is a still further object of the present invention to provide an airport terminal aircraft gate traffic management system that can be implemented in existing airports with only minor modification to existing structures, thereby avoiding the need to extensively renovate or demolish and rebuild airport structures, as well as the time and costs of obtaining permits and regulatory approvals and construction.

In accordance with the aforesaid objects, an airport terminal aircraft gate traffic management system is provided wherein one or more and preferably a plurality of the aircraft landing, parking, moving on the ground, and taking off from an airport are equipped with non-engine drive means mounted on one or more landing gear wheels that are controllable to drive the one or more landing gear wheels to move the aircraft autonomously during ground travel without reliance on the aircraft's main engines or tow vehicles to enable the free flow of aircraft traffic into and out of terminal gates and parking stands. The aircraft are driven by the drive means-powered landing gear drive wheels upon touchdown directly to a parking space at a terminal gate. Non-engine drive means-equipped aircraft can be driven to park in any parking orientation, from the traditional nose-in orientation to an orientation parallel to the terminal without the hazards associated with jet blast or engine ingestion in a parking space sized to provide clearance for aircraft to maneuver freely into and out of the space while traveling only in a forward direction. Passengers may leave and/or board aircraft virtually immediately after an aircraft is parked by jet bridge or by stairs at the aircraft exits. When a non-engine drive means-powered aircraft is ready and cleared for departure, a pilot of the aircraft is able to turn and drive the aircraft in a forward direction out of its terminal gate or parking space without assistance. Providing flexibly movable jet bridges and/or service equipment at gates and other parking areas facilitates their movement and connection to the aircraft when needed and their removal from an aircraft's clearance area when the aircraft is ready to leave a parking space. Airport terminal aircraft gate traffic is most effectively managed when a significant number of aircraft at an airport are equipped with non-engine drive means controllable for autonomous aircraft ground movement, although aircraft gate traffic management is facilitated when even only a small number of aircraft are capable of autonomous ground movement. Selected aspects of the airport terminal gate traffic management system of the present invention may be automated to enhance system performance, traffic flow, and aircraft turnaround efficiency. The present airport terminal aircraft gate traffic management system can be implemented with only minor, if any, modifications to existing airport structures or facilities without the need to renovate or tear down and rebuild airport structures and, therefore, can avoid the challenges and costs associated with obtaining regulatory permits, approvals, or licenses and construction.

Other objects and advantages will be apparent from the following description, claims, and drawings.

DESCRIPTION OF THE INVENTION

Increasing the efficiency with which airport gate operations can be conducted to move aircraft, passengers, and cargo as quickly and safely as possible between arrival and departure continues to be a goal of airports and airlines. Inefficiencies and delays can have both local and widespread undesirable effects for both passengers and airlines. The airport terminal aircraft gate traffic management system of the present invention, which enables the free flow of aircraft gate traffic, provides a number of advantages. The system described herein increases the safety and efficiency of gate operations, in part by eliminating jet blast and engine ingestion hazards associated with operating aircraft engines near an airport terminal and by reducing numbers of ground personnel and vehicles needed to support engines-on taxi. Aircraft taxi, parking, and ground travel in the present traffic management system are controlled primarily by aircraft pilots, who can control aircraft maneuvers into and out of gate and stand parking. The efficiency of passenger movement into and out of a parked aircraft is maximized by the ability to use all aircraft passenger doors for deplaning and boarding, simultaneously, if desired. Flexibly movable jet bridges are provided that can be extended to connect with a parked aircraft and then retracted to maximize space at a parking location so an aircraft has a least the minimum clearance required to turn and leave the parking location at departure and also permitting more aircraft to fit into terminal parking spaces. Servicing of aircraft can begin virtually immediately upon arrival at a parking space and can be made more efficient by providing fixed dedicated services equipment designed to connect directly to aircraft at the parking location. Additionally, the present gate traffic management system can be substantially completely automated to further improve traffic flow and the efficiency of airport gate operations.

Implementation of the present airport terminal aircraft gate traffic management system can be accomplished with substantially minor, if any, modifications to existing airport or terminal structures. Any changes needed are likely to be covered by existing permits or authorizations. Neither the extensive renovation of existing airport facilities nor the demolition of these facilities and the design and construction of new facilities is required to obtain the significant improvements in traffic flow possible with the present invention. Consequently, the regulatory approvals, permits, and licenses required for airport or terminal renovation or new construction will not be needed. The time, costs, and challenges associated with obtain these approvals and renovating existing airport or terminal structures or designing and constructing new ones are not considerations.

Figure 1:
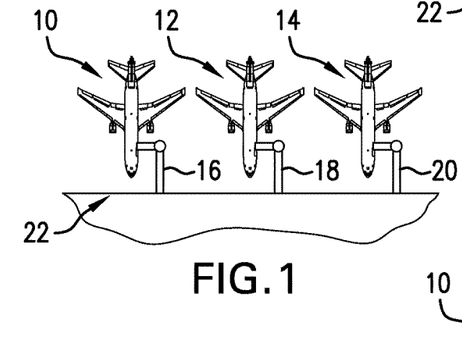
FIG. 1 is a diagram of an airport terminal showing a typical current situation in which three aircraft are parked at gates and connected to passenger loading bridges at an airport where the aircraft are not equipped with pilot controllable non-engine drive means for autonomous ground travel and use engines and tow vehicles to move them on the ground into and out of the terminal gates.

Referring to the drawings, FIG. 1 is a diagram of three aircraft 10, 12, and 14 parked at respective passenger loading bridges or jet bridges 16, 18, and 20, representing three airport terminal gates as they are currently used. The spacing between aircraft 10, 12, and 14 in FIG. 1 and the other drawings is not shown drawn to scale. Spacing and clearance between aircraft is discussed in connection with FIGS. 5, 6, and 7. The jet bridges 16, 18, and 20 are attached to a terminal building 22 and provide a protected walkway for passengers to move between an aircraft and the terminal building during both boarding and departing the aircraft. None of the aircraft 10, 12, and 14 are equipped with drive means controllable to move the aircraft autonomously on the ground without reliance on the aircraft engines or tow vehicles. Consequently, the aircraft engines are required to provide the power to move the aircraft into the gate so they can dock at and attach to the jet bridges 16, 18, and 20. Passengers and crew cannot leave the aircraft until the aircraft engines have been turned off, and ground personnel and service vehicles must also stay clear of the aircraft until engines are off. The dangers from jet blast and engine ingestion when aircraft engines are operating in a congested terminal area have been well documented, and providing a safe terminal environment requires waiting until to unload and service aircraft, even if delays in gate operations result.

When the aircraft in FIG. 1 are cleared for departure, tugs or tow vehicles (not shown) must be connected to the nose ends of the aircraft to push them back from the terminal building 22 to a location where at least one of the engines can be started and the aircraft can be moved in a forward direction to a takeoff runway. At some airports, powered pushback, in which aircraft engines are operated in reverse thrust, is another option for moving aircraft away from terminal parking places; this option, however, is accompanied by jet blast and engine ingestion hazards. Terminal gates typically provide sufficient space so that only one aircraft at a time can be pushed back and depart the gate. The current gate traffic system, with its widely acknowledged potential for inefficiency and airline schedule delay, desperately needs improvement to accommodate increasing air travel.

When space at terminal gates or other aircraft parking areas is tight, as is the case at many airports, aircraft today, in which ground movement is powered by the aircraft's engines, cannot maneuver effectively. Such aircraft not only have difficulty turning with a precise turning radius and cannot precisely control the distance traveled, but the challenges of jet blast and engine ingestion are present as long as the engines are operating. Consequently, aircraft today cannot simply drive into and out of gates. FIGS. 2a-2d illustrate the improvements in gate traffic management possible when the aircraft 12 of FIG. 1 is equipped with landing gear wheel drive means controllable by an aircraft pilot to move the aircraft autonomously during ground travel without using the aircraft's engines.

The passenger loading bridge or jet bridge 18 in FIGS. 2a-2d has a different design than the jet bridges 16 and 20 that allows the jet bridge 18 to extend toward and connect with aircraft 12 for passenger transfer and then to retract toward the terminal building 22 to maximize a clear area around the aircraft to permit the aircraft to turn and leave the gate as described below. There are many available jet bridge designs that can accomplish this purpose.

The jet bridge 18 is shown in FIGS. 2a-2d as having two articulation points 24 and 26, compared to the single articulation point 28 provided in the jet bridges 16 and 20. Other flexibly movable jet bridge designs that provide similar flexibility to permit them to be extended toward an aircraft and retracted out of the gate area to occupy minimal space are contemplated for use with the present system. Jet bridges could collapse in three dimensions, for example, toward the terminal, toward the ground, and/or toward a side. They could also be moved vertically upward or downward in their typical locations to avoid contact with aircraft wings. Jet bridges with a collapsible and extendible concertina-type structure, as well as jet bridges on wheels, are also available and could be used as described herein. A "pop-up" jet bridge that is raised and lowered into a ground space would also be useful in the present system. One suitable type of jet bridge useful in the present invention is an extendable and retractable jet bridge available under the name of Crystal Bridge from ThyssenKrupp Airport Systems. Any other passenger loading bridge or jet bridge in addition to those described above that can connect to a parked aircraft to transfer passengers directly between a terminal and the aircraft and can then be collapsed, folded, retracted, or otherwise moved out of the aircraft's parking space to provide a maximum area for aircraft gate traffic maneuver as discussed below could be used effectively with the present gate traffic management system. It is contemplated that any type of flexibly movable jet bridge type of structure that functions as described herein would be suitable for the present gate traffic management system.

Figure 2A:
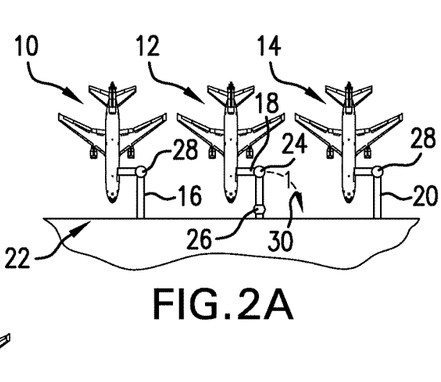
FIGS. 2a-2d are diagrams of an airport terminal with three aircraft parked at gates with flexibly movable passenger loading bridges, where one of the aircraft is equipped with pilot controllable non-engine drive means for autonomous aircraft ground movement, and the pilot can control the drive means to turn the aircraft and drive it in a forward direction into the gate and then out of the gate after the aircraft has been cleared for departure.
Figure 2B:
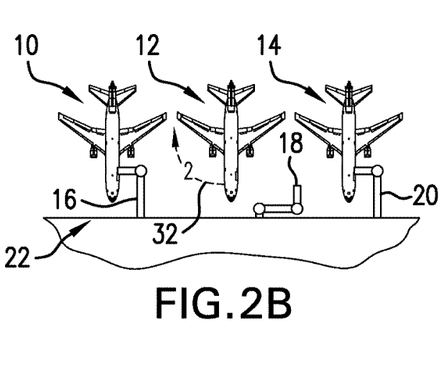
Figure 2C:
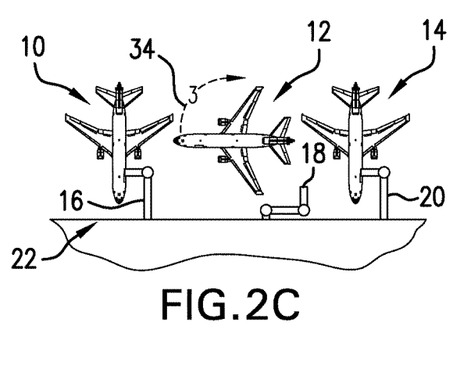
Figure 2D:
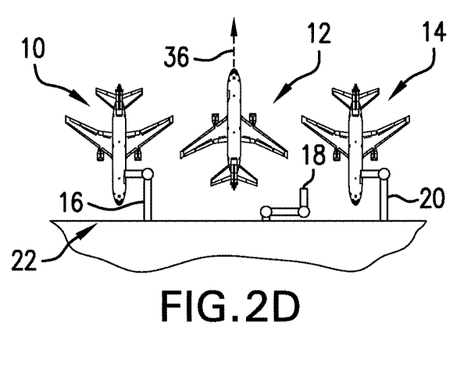

When aircraft 12 is cleared for departure from its gate, there is no wait for a pushback tug or a tow bar. Once the jet bridge 18 is moved out of the space required for aircraft 12 to turn, for example toward the terminal 22 as indicated by arrow 30 in FIG. 2a, the aircraft's pilot controls activation of the landing gear wheel non-engine drive means and uses the drive means to turn the aircraft around in place at the gate or other parking location. When the jet bridge 18 has been moved out of the way and the pilot has confirmed clearance from ground interference, she can turn the aircraft as shown in FIGS. 2c and 2d, enter airport ground traffic and proceed to a runway. Since the aircraft is not pushed back and, consequently, would not block a taxiway so that visual sight lines may be maximized, the pilot can proceed without waiting for the formal approvals now required. This process will work especially well where taxiways are wide enough to accommodate two-way aircraft traffic. When the aircraft is ready, it can be driven away from a gate or other parking location essentially immediately, which provides the potential to increase airport throughput significantly.

It is preferred that aircraft 12 be equipped with a non-engine drive means mounted to drive each nose wheel in a pair of nose wheels, although other drive means arrangements could also be employed. Operation of the drive means can be controlled by the pilot to permit the aircraft to rotate around one nose wheel to make the 180° turn shown in FIGS. 2c and 2d to turn the aircraft nose away from the terminal 22 so the aircraft can travel in a forward direction to a takeoff runway. Arrow 32 in FIG. 2b indicates one direction in which the aircraft could turn. In FIG. 2c, the aircraft has turned 90° away from the terminal building 22 along the path indicated by arrow 32 (FIG. 2b). Arrow 34 indicates the path the aircraft will follow from this point to complete the 180° turn required to follow the straight path indicated by arrow 36 in FIG. 2d to travel away from the gate. The aircraft pilot may use the landing gear wheel drive means to control the aircraft's 180° turning maneuver from a nose-in parking position at the gate to a nose-out departure position with no, or only minimal, assistance from ground personnel. As a result, wing walkers, ground marshals, and other ground personnel that usually guide an aircraft's pushback and subsequent turns are not required and can be freed for other ground operations tasks.

The pilots of aircraft 10 and 14, which are not equipped with controllable landing gear wheel non-engine drive means, cannot control their departures because they need pushback equipment and operators, as well as wing walkers or other ground personnel, to be available before they can depart. In addition, equipping substantially all aircraft using airport terminal gates with controllable non-engine drive means enables these aircraft to quickly and easily maneuver and travel autonomously away from their gates at appropriate intervals determined by airline schedules rather than by airport equipment availability.

Figure 3A:
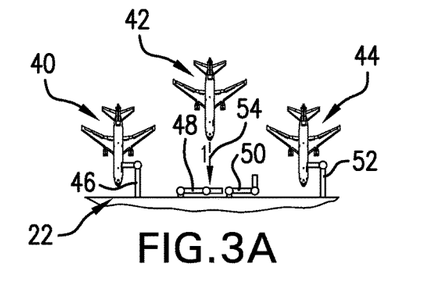
FIGS. 3a-3h are diagrams of an airport terminal with three aircraft parked at gates with flexibly movable jet bridges, where one aircraft equipped with controllable non-engine drive means for autonomous aircraft ground movement is shown arriving at a gate, parking parallel to the terminal at the gate, connecting to a pair of extended jet bridges to permit simultaneous passenger departure and boarding at front and rear exits prior to departure from the gate, and after receiving departure clearance and the jet bridges have been moved out of the way, turning to depart the gate.
Figure 3B:
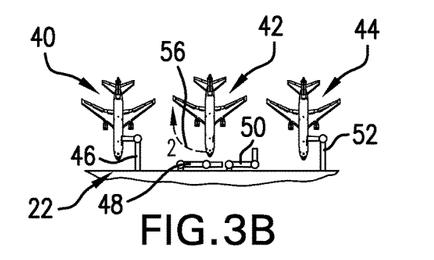
Figure 3C:
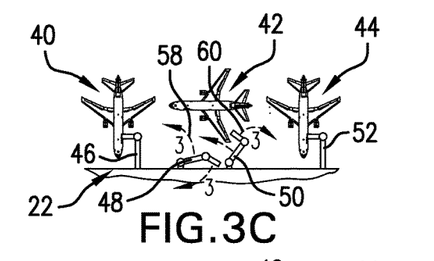

FIGS. 3a-3h are diagrams showing another approach to gate traffic management and gate operations in accordance with the present invention that is different from that shown in FIGS. 2a-2d. In this approach, aircraft 40 and 44 are not equipped with landing gear wheel non-engine drive means controllable for autonomous ground movement and are shown parked at jet bridges 46 and 52, respectively. Aircraft 42 is equipped with landing gear wheel non-engine drive means controllable for autonomous ground movement. Two jet bridges 48 and 50 are shown moved close to the terminal building 22. Aircraft 42 is traveling along the path shown by arrow 54 with its nose end directed toward the terminal building 22. As aircraft 42 approaches the terminal building 22, the pilot may begin to turn the aircraft in the direction of arrow 56 (FIG. 3b), as described in connection with FIG. 2b. As shown in FIG. 3c, the aircraft 42 has turned along the path of arrow 56 so that the aircraft nose has turned 90° away from the terminal building 22 and the longitudinal or longest axis of the aircraft 42 is positioned substantially parallel to the terminal building.

Figure 3D:
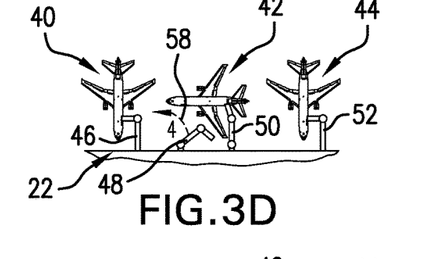
Figure 3E:
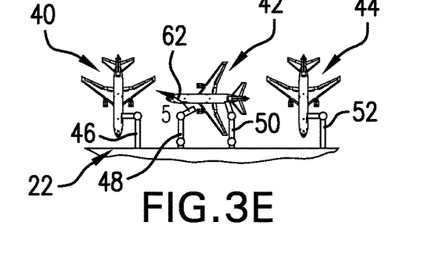
Figure 3F:
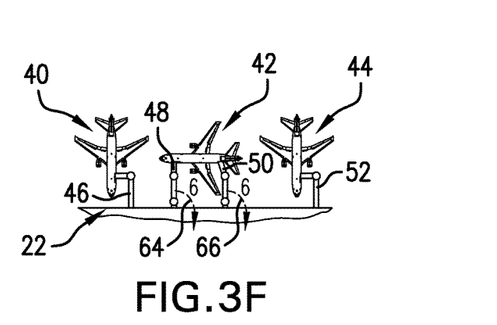

The jet bridges 48 and 50 are moved, such as along the paths indicated by respective arrows 58 and 60 in FIGS. 3c and 3d, and jet bridge 48 is fully extended along the path indicated by arrow 62 in FIG. 3e. As indicated above, this is only one type of flexibly movable jet bridge suitable for use with the present invention and is intended only to be illustrative. Whichever type of jet bridge is selected for use, the two jet bridges 48 and 50 should be located at the terminal building 22 in spaced locations that will enable a jet bridge to be connected to each of an aircraft's front and rear doors when the jet bridges are fully extended, as shown in FIG. 3f. In some situations, only a single jet bridge may be needed and will be extended and connected to only an aircraft front or rear door as described. When two jet bridges are used, both the front and rear doors may be used for passengers leaving the aircraft upon arrival to minimize the time required to clear the aircraft and prepare it for a departing flight. Passengers may also board through both front and rear doors to minimize the time needed to board the aircraft prior to departure. To further maximize time savings, arriving passengers may be directed to leave the aircraft through one door and departing passengers may be directed to board the aircraft through the other door.

Figure 3G:
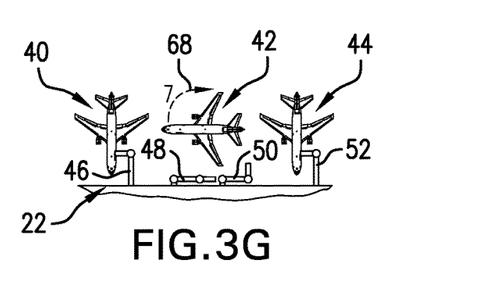
Figure 3H:
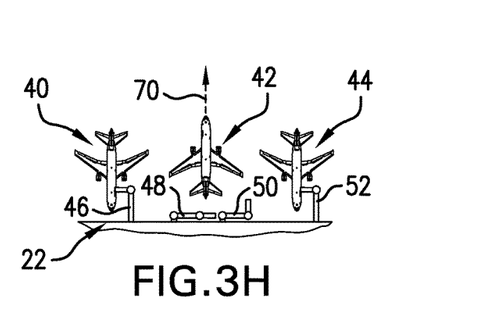

When all passengers and crew have boarded aircraft 42 and it is ready for departure, the jet bridges 48 and 50 are moved away from the aircraft, such as along the paths indicated by respective arrows 64 and 66 in FIG. 3f. The jet bridges 48 and 50 may assume the positions shown in FIGS. 3g and 3h so that they are as close to the terminal as possible or are otherwise moved out of the space required for aircraft 42 to turn from its position parallel to the terminal 22 along the path indicated by arrow 68 in FIG. 3g. FIG. 3h illustrates aircraft 42 after it has turned 90° along the path of arrow 68 so that the aircraft's nose end is pointing away from the terminal building 22, and the aircraft is ready to be moved autonomously by the landing gear wheel non-engine drive means in a forward direction, such as along the path indicated by arrow 70, to a takeoff runway.

It is contemplated that operation of the passenger loading bridges or jet bridges 48 and 50 to extend, connect with the aircraft 42, and then retract or to move in other ways can be fully automated and may be controlled by suitable control equipment, processors, and software accessible by aircraft flight crew, when necessary, as well as by airport gate and ground personnel in communication with the aircraft flight crew during normal operations. Proximity sensors and the like may be provided on the jet bridges and/or on the aircraft to assist with docking or connection, as well as to provide position information or alerts if an aircraft moves too close to a jet bridge or other airport structure while maneuvering as described herein.

In FIGS. 3a-3h, the aircraft is shown in an orientation parallel to the terminal building 22 so that side of the aircraft with the doors that are currently used primarily for passenger egress and ingress is facing toward the terminal and the side of the aircraft with the cargo bay doors is facing away from the terminal. In this orientation, service vehicles, such as baggage carts, fuel vehicles, catering trucks and the like, which are not shown, may be limited to the side of the aircraft away from the terminal to keep all of this activity on a single side of the aircraft, which could have benefits at some airports. FIGS. 4a-4h show the same sequence of aircraft arrival and departure maneuvers at a terminal with flexibly movable jet bridges as shown in FIGS. 3a-3h. In FIGS. 4c-4g, however, the aircraft 42 has turned 90° from its nose-in arrival position to assume a position parallel to the terminal building 22 with the aircraft side that has cargo bay doors facing the terminal. Since aircraft typically have front and rear egress and ingress doors on both sides of the aircraft, this orientation does not affect passenger deplaning and boarding. In the aircraft orientation shown in FIGS. 4c-4g, access to cargo will be on the terminal side of the aircraft, which may facilitate baggage or cargo handling. A baggage conveyor (not shown), for example, may be located to extend out to the aircraft from the terminal 22 so baggage can be placed directly on a conveyor directly connected with the terminal when it is removed from the aircraft. Catering services could be similarly located and provided. Other services could also have dedicated supplies or sources fixed in place or connected with terminal. Fuel, air, and/or water lines, for example, may be connected to the terminal, which could eliminate the need for vehicles supplying them. Additionally, the structures or means for providing these services could be flexibly movable to extend toward the aircraft during servicing and retract out of the way after servicing has been completed. Other equivalent arrangements are also contemplated to be included within the present system. The aforementioned service provision structures enable an aircraft's parking space to be cleared quickly and, additionally, minimize service vehicle use in an aircraft's parking area, which permits the aircraft pilot to confirm clearance from ground interference from these sources sooner than might otherwise be the case. An aircraft should be able to depart from the terminal more quickly than is possible at the present time.

Figure 4A:
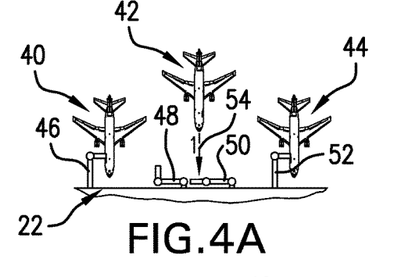
FIGS. 4a-4h are diagrams showing the same sequence of steps as in FIGS. 3a-3h, except the aircraft is parked in an orientation parallel to the gate with cargo doors facing toward the terminal rather than away from the terminal.
Figure 4B:
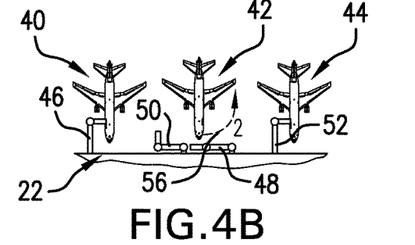
Figure 4C:
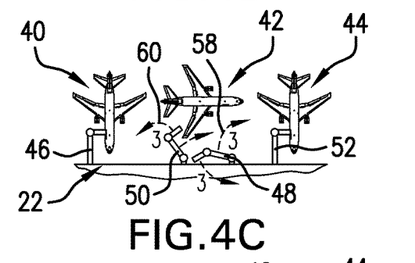
Figure 4D:
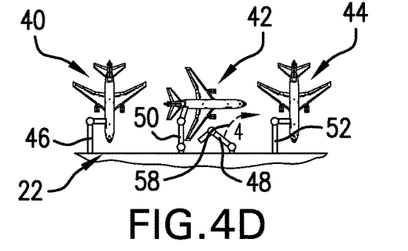
Figure 4E:
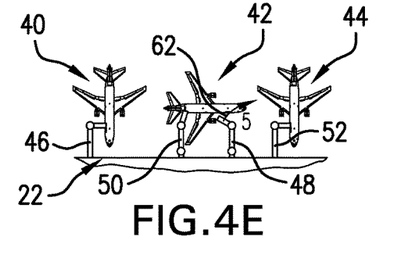
Figure 4F:
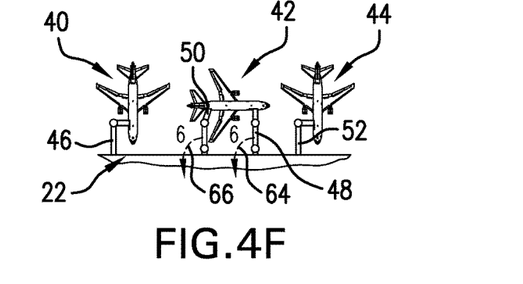
Figure 4G:
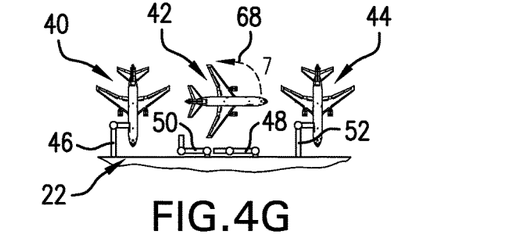
Figure 4H:
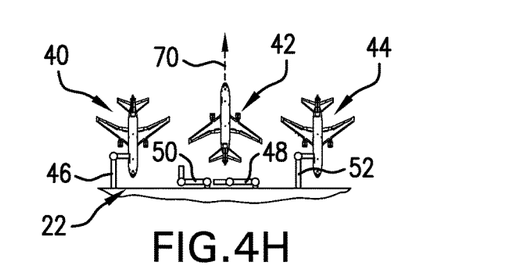

The aircraft 42 may approach the terminal building 22 nose-in along the path indicated by arrow 54 in FIG. 4a and turn along the path indicated by arrow 56 (FIG. 4b) 90° in a direction opposite the direction in which aircraft 42 turns in FIG. 3c. As noted above, the side of the aircraft with the cargo doors is now facing the terminal 22. The flexibly movable jet bridges 48 and 50, shown moved away from the aircraft in FIGS. 4a and 4b, may be moved as shown in FIGS. 4c-4e until they connect with the front and rear doors (not shown) of the aircraft 42 to permit arriving passengers to walk to the terminal and departing passengers to walk from the terminal to the aircraft. As discussed above, the time required for passenger egress and ingress can be minimized with this arrangement. When the aircraft is fully boarded and ready for departure, the jet bridges 48 and 50 may retract, such as along paths indicated by arrows 64 and 66, out of the area needed for aircraft 42 to turn 90°, such as along the path identified by arrow 68 in FIG. 4g, to assume the nose-out position shown in FIG. 4h. The aircraft's landing gear wheel non-engine drive means may be controlled by the aircraft pilot to move the aircraft in a forward direction, such as along the path indicated by arrow 70, to a runway where the aircraft's engines may be started just prior to takeoff.

The aircraft's ground movements from shortly after the aircraft lands until just prior to takeoff are preferably controlled by controlling operation of the one or more non-engine drive means that power one or more of the aircraft's nose or main landing gear wheels. Operation of the aircraft's main engines and the use of tow vehicles are not needed to move the aircraft, except, perhaps in an emergency situation. As shown, equipping aircraft landing gear wheels, particularly nose landing gear wheels, with non-engine drive means controllable to move aircraft during taxi provides significant advantages for the management and control of airport terminal aircraft ground traffic. The jet blast and engine ingestion dangers associated with operation of the aircraft's engines while an aircraft is moving or parked on the ground, especially with respect to adjacent aircraft, are eliminated when engine operation is eliminated. Using controllable non-engine drive means to drive nose landing gear wheels enhances aircraft maneuverability on the ground and enables an aircraft to turn in place as shown and discussed in connection with FIGS. 2, 3, and 4. An aircraft so equipped with non-engine drive means is capable of these tight turns and rotation without producing stress on the nose landing gear. Aircraft in which ground movement is powered by the aircraft's engines, such as aircraft 10 and 14 in FIGS. 1 and 2, cannot turn without jet blast or engine ingestion adversely affecting everything within the engine hazard zone, which includes other aircraft.

Figure 5:
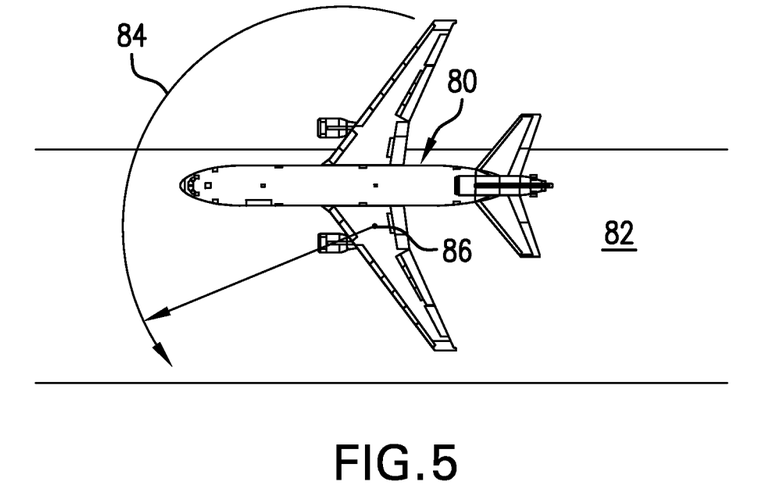
FIG. 5 is a diagram of an aircraft equipped with non-engine drive means for autonomous ground movement as described herein showing a minimum wing tip and turning radius for the type of aircraft shown.

FIG. 5 is a diagram showing the turning radius for the particular aircraft shown, which is a Boeing 737-700 aircraft. Other aircraft may have slightly different turning radii. The aircraft 80 is shown on a minimum width of pavement 82 needed for turning. Since airport gate and parking areas tend to be fully paved, this dimension is not likely to be a concern for gate traffic. Arc 84 is a portion of a circle representing the aircraft's wing span, which is indicative of the outermost extent of the aircraft 80. The minimum clearance required for turning the aircraft 80 safely through 90° and 180° as shown in FIGS. 2, 3, and 4 will be a circle centered at point 86 representing the aircraft wing tip radius, as shown in FIG. 5. This turning radius is based on an effective nose wheel steering angle of about 75°. A steering angle of about 80° may be possible when an aircraft, such as aircraft 12 and 42 in FIGS. 2, 3, and 4, equipped with landing gear wheel non-engine drive means are maneuvering to turn at a gate. Even tighter turns may be possible when an aircraft, such as aircraft 80, is retrofitted with landing gear capable of making tighter turns. Generally, about 150 feet between gates will provide a safe and effective clearance for an aircraft with a wingtip to wingtip distance of about 118 feet when the aircraft turns as shown and discussed herein, although this distance will depend on the kinds of aircraft to be accommodated by the airport terminal.

Figure 6:
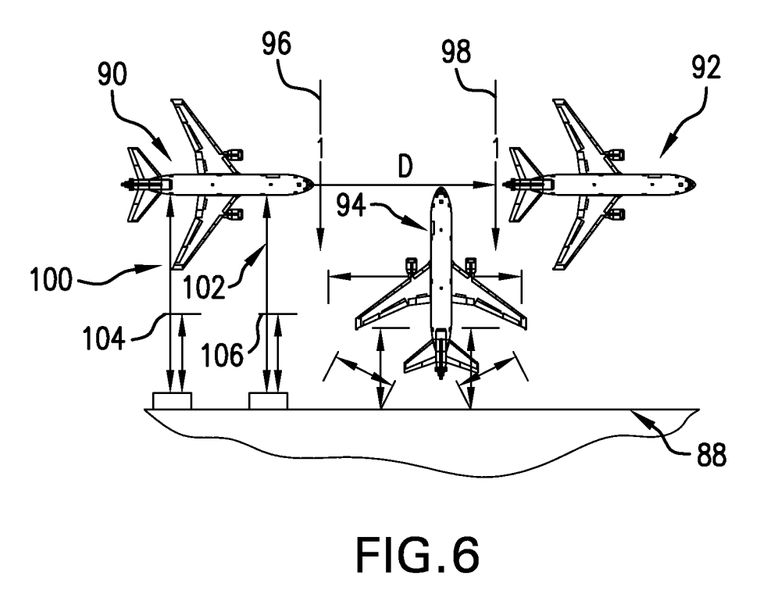
FIG. 6 is a diagram showing relative clearances required for adjacent aircraft and available flexibly movable jet bridges when aircraft equipped with non-engine drive means for autonomous ground movement as described herein park parallel to an airport terminal gate as shown in FIGS. 3a-3h and 4a-4h.

FIG. 6 shows in greater detail the minimum clearance possible when an airport gate uses the double jet bridge configuration shown in FIGS. 3a-3h and 4a-4h. This clearance represents the narrowest gate distance possible and the smallest variation in distance possible when the longest and shortest collapsible passenger loading bridges or jet bridges available from ThyssenKrupp are used. Aircraft 90 and 92 are oriented parallel to a terminal building 88, and aircraft 94 is shown after it has been turned and is ready to move autonomously to a takeoff runway. The width of the gate where aircraft 94 is departing is indicated by the distance D between vertical lines 96 and 98. This represents sufficient clearance for aircraft 94 to turn from a nose-in to a nose-out position as described above in connection with FIGS. 2a-2d. Aircraft 90 is shown parked as far away from the terminal building 88 as is possible when the longest available jet bridges 100 and 102 are extended. The closest distance to the terminal 88 that an aircraft may be parked using the shortest available jet bridges is represented by lines 104 and 106. In some airports and in some weather conditions, parking closer or farther from the terminal may have advantages.

Figure 7A:
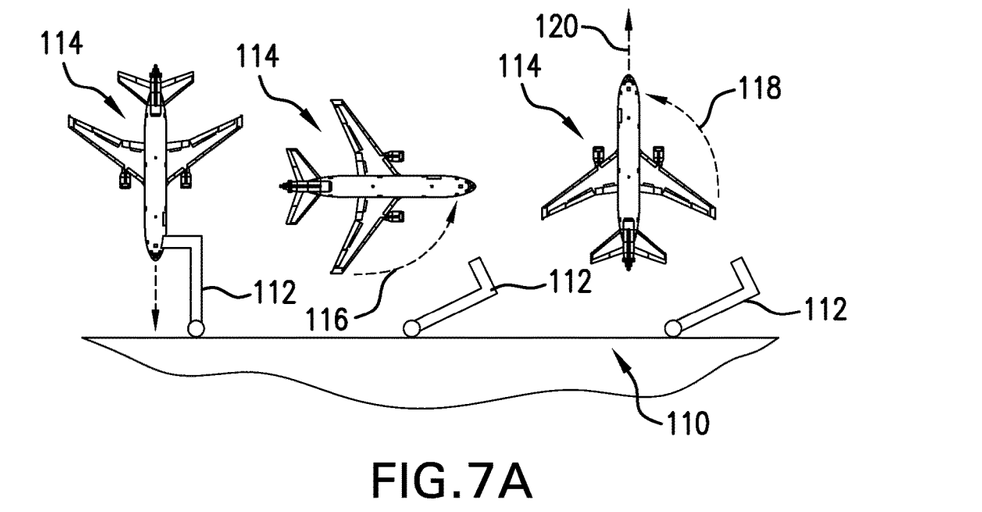
FIGS. 7a and 7b are diagrams further illustrating additional aircraft traffic flow possibilities for aircraft equipped with non-engine drive means for autonomous ground movement arriving and parking at a terminal and leaving the terminal in accordance with the present gate traffic management system.
Figure 7B:
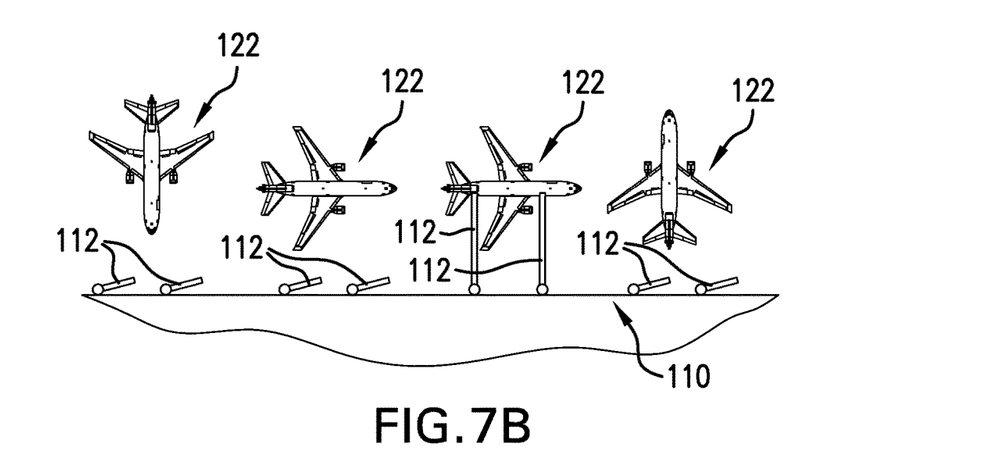

FIGS. 7a and 7b illustrate additional aircraft terminal gate traffic flow possibilities in accordance with the present gate traffic management system. In FIG. 7a, an aircraft terminal 110 has a number of flexibly movable jet bridges 112, three of which are shown. The jet bridges are shown in FIGS. 7a and 7b to be rotatably attached to the terminal 110 and spaced to rotate into and out of connection with aircraft doors. Other terminal and/or ground attachment structures and methods are also contemplated for use with the present gate traffic management system. An aircraft 114 equipped with nose landing gear wheel non-engine drive means as described above is parked at the terminal in a traditional nose-in position. A flexibly movable jet bridge 112 has been connected to the aircraft to permit the movement of passengers, crew, cleaning and other service personnel into and out of the aircraft while it is parked at the gate. When departing passengers have boarded, the flexibly movable jet bridge is moved away from the aircraft, and the aircraft has been cleared for departure, the aircraft pilot may activate and control the nose wheel non-engine drive means to turn the aircraft 114, such as along a path indicated by the arrow 116 and then along a path indicated by arrow 118 to a nose-out position so the aircraft can leave the gate parking area, such as by a path indicated by arrow 120.

In FIG. 7b, the aircraft traffic flow through the gate differs from that shown in FIG. 7a in that the aircraft 122 approaches the terminal in a nose-in position and then rotates or turns 90° to park with the longest axis of the aircraft parallel to the terminal. The flexibly movable jet bridges 112 shown attached to the terminal in FIG. 7b are spaced differently than those in FIG. 7a to accommodate connections to two aircraft doors. The jet bridges 112 are shown in a retracted position close to the terminal 110 and away from gate parking spaces to facilitate parking of the aircraft parallel to the terminal. Upon arrival at the terminal 110, the aircraft 122 may turn as described and travel to an assigned gate parking space or stand. Two flexible movable jet bridges 112 are shown extended to connect with the aircraft front and rear doors, although in some situations, only one jet bridge may be connected to the aircraft. When the aircraft is ready for departure, the jet bridges 112 can be moved away from the aircraft to clear the parking space, and the aircraft pilot may activate and control the nose wheel non-engine drive means to turn the aircraft 90° so the nose is directed away from the terminal and the aircraft may be driven away from the terminal.

All of the aircraft movements shown in FIGS. 7a and 7b move an aircraft in a forward direction. This provides an aircraft pilot with the ability to constantly keep the aircraft travel area in view while the aircraft is turning and moving into or out of a terminal parking area. Driving the aircraft in reverse, while not necessary with the present traffic management system, may also be done, if necessary, by controlling the non-engine drive means to move the aircraft in reverse.

The present gate traffic management system has been discussed in connection with aircraft that use passenger loading bridges or jet bridges at terminal gates or stands to transfer passengers between an airport terminal and the aircraft. Airports in many countries do not have terminal buildings with jet bridges. In these airports, when an aircraft arrives at a gate, either the aircraft's stairs are lowered or ground personnel bring portable stairs to aircraft that do not have integral stairs. These aircraft can also benefit significantly from the gate traffic management advantages that accompany equipping them with landing gear wheel non-engine drive means to move the aircraft autonomously on the ground. Passengers can leave the aircraft as soon as the aircraft has come to a stop, the doors are open, and the stairs are in place without waiting for the aircraft's engines to be turned off and the turbines to stop moving. Since aircraft typically have two front and two rear doors, stairs may be provided for all four doors. All four doors may be used by the passengers leaving the aircraft, which will empty it very quickly. Deplaning and boarding may be conducted simultaneously, with deplaning passengers leaving by one set of doors and boarding passengers by another set.

Since this type of aircraft is often used by low cost carriers that usually perform minimal, if any, cleaning of the aircraft between arrival and departure in the interest of a faster turnaround, time typically set aside to clean or tidy an aircraft between flights may not be needed. If an airline does clean aircraft between flights, the cleaning process can be conducted more quickly and efficiently. Cleaning crews may enter through forward or rear doors and proceed through the aircraft in one direction without having to turn around or move past other cleaning crew members.

External servicing of an aircraft may take place as soon as the aircraft pulls into the gate area and while passengers are leaving and entering the aircraft, which can further reduce the time the aircraft is on the ground. Internal servicing may be conducted, without passengers onboard the aircraft, in a similar manner as described for cleaning, with service personnel moving through the aircraft in a single direction from fore to aft or vice versa, which may enable them to carry out their service tasks more efficiently.

Aircraft that use stairs instead of jet bridges may park closer to gates and terminal services, thus minimizing the distance passengers and crew need to walk to reach a gate or terminal building. Ground level covered walkways with roofs below aircraft wing heights may also be provided to direct deplaning and boarding passengers toward the terminal or toward the aircraft since these passengers may deplane and board the aircraft at different locations. Providing covered walks and/or minimizing the distance passengers must walk to a terminal, particularly in very cold, wet, or hot climates, will increase passengers' comfort and convenience.

An aircraft parked closer to a terminal than is currently possible may also be closer to services, such as fuel lines, for example. As discussed above, baggage conveyors and/or catering services could be located to extend out of the terminal toward an aircraft, much like flexibly movable jet bridges, to facilitate unloading and loading of baggage, cargo, food, and beverages.

The present gate traffic management system significantly reduces the numbers of service vehicles and ground personnel compared to what are typically needed to manage gate traffic and gate operations at today's airports. When the number of ground vehicles is reduced, ground congestion near the terminal and potential problems associated with ground vehicle operation are also reduced. Additionally, pilot control of aircraft taxi and ground travel through activation of a landing gear wheel non-engine drive means to move the aircraft autonomously during gate operations further reduces the potential for errors, mistakes, and miscommunications. The present gate traffic management system provides a way to maximize the flexibility of airport gate operations as well as to minimize the time required for such gate operations.

To achieve maximum flexibility of airport gate operations and to minimize the time required for gate operations as described herein, aircraft are equipped with one or more landing gear wheel non-engine drive means that power one or more landing gear wheels to rotate and move the aircraft autonomously on the ground without reliance on aircraft main engines or tow vehicles. A preferred location for non-engine drive means is the aircraft nose landing gear wheels. Providing non-engine drive means on one or more main landing gear wheels may also be suitable for some aircraft. A preferred non-engine drive means is an electric motor assembly, preferably powered by the aircraft auxiliary power unit, that is capable of operating at the torque and speed required to move an aircraft landing gear wheel and, therefore, an aircraft on the ground. An example of one of a number of suitable types of non-engine drive means useful in an aircraft landing gear drive wheel that could be used effectively in the present gate traffic management system is an inside-out electric motor in which the rotor may be internal to or external to the stator, such as that shown and described in U.S. Patent Application Publication No. 2006/0273686, the disclosure of which is incorporated herein by reference. A range of motor designs capable of high torque operation across a desired speed range that are capable of moving an aircraft wheel and functioning as described herein may also be suitable non-engine drive means for moving aircraft in the present aircraft gate traffic management system. A high phase order electric motor of the kind described in, for example, U.S. Pat. Nos. 6,657,334; 6,838,791; 7,116,019; and 7,469,858, the disclosures of the aforementioned patents being incorporated herein by reference, can be effectively used as a drive means. One particularly suitable non-engine drive means is a high phase order induction motor with a top tangential speed of about 15,000 linear feet per minute and a maximum rotor speed of about 7200 rpm, although drive means capable of a wide range of such speeds may be used. Other drive means, including hydraulic and/or pneumatic drive means, are also contemplated to be useful as landing gear wheel non-engine drive means.

While the present invention has been described with respect to preferred embodiments, this is not intended to be limiting, and other arrangements and structures that perform the required functions are contemplated to be within the scope of the present invention.

INDUSTRIAL APPLICABILITY

The airport terminal aircraft gate traffic management system of the present invention will find its primary applicability where it is desired to increase the efficiency and safety of, reduce the time required for, and reduce causes for delay of airport gate operations, improving gate traffic flow.

The invention claimed is:

1. A method for maximizing flexibility of airport gate operations and minimizing time required for gate operations at airports where aircraft are driven into and out of airport gate parking locations to park at the parking locations in a parallel parking orientation with a longest axis of the aircraft parallel to an airport terminal building without operation of aircraft engines or attachment to tow vehicles, comprising:
   a. equipping aircraft driving into and out of gate parking locations at an airport with engines-off taxi systems comprising pilot-controllable landing gear wheel-mounted electric drive motors operable to drive the aircraft into and out of the gate parking locations and to turn the aircraft within the gate parking locations;
   b. providing a plurality of aircraft gate parking locations located adjacent to the airport terminal building and sized to provide at least a minimum clearance for the aircraft to be turned by the pilot with the electric drive motors at least 180° completely within the minimum clearance, each of the plurality of parking locations having at least two extendible and retractable passenger loading bridges spaced to provide simultaneous perpendicular parallel connections between the airport terminal building and front and rear doors of an aircraft parked in the parallel parking orientation with the longest axis parallel to the airport terminal building at each of the plurality of parking locations;
   c. driving an arriving aircraft by a pilot controlling the pilot-controllable electric drive motors in a forward direction into one of the plurality of parking locations, turning the aircraft 90° in a desired direction completely within the minimum clearance with the electric drive motors, and parking the arriving aircraft in the parallel parking orientation with a first side or a second side of the aircraft facing the airport terminal building;
   d. extending the at least two passenger loading bridges to at least two aircraft front and rear doors on a first, terminal-facing side of the aircraft so that the at least two passenger loading bridges are parallel to each other and perpendicular to the aircraft and to the airport terminal building and form the perpendicular parallel connections directly between the airport terminal building and the at least two front and rear doors of the aircraft; and
   e. simultaneously transferring arriving and departing passengers between the equipped aircraft and the airport terminal building through the at least two perpendicular parallel passenger loading bridges and servicing the aircraft and
   at departure, retracting the at least two passenger loading bridges to clear the parking location, controlling the electric drive motors by the pilot and driving the departing aircraft forward while turning the departing aircraft 90° with the electric drive motors completely within the minimum clearance so that a nose end is facing away from the airport terminal building and the longest axis is perpendicular to the airport terminal building, and continuing to control the electric drive motors by the pilot to drive the departing aircraft in only a forward direction away from the airport terminal building to a takeoff runway.

2. The method of claim 1, further comprising providing and integrally locating aircraft services required to service said aircraft at each of said plurality of aircraft gate parking locations so that said aircraft services are easily accessible and available for servicing said aircraft immediately when said aircraft is parked in the parallel parking orientation simultaneously with passenger transfer.

3. The method of claim 2, wherein said aircraft services comprise at least baggage services, catering, and aircraft fuel services.

4. The method of claim 1, further comprising providing multiple extendible and retractable passenger loading bridges and spacing the extendible and retractable passenger loading bridges at aircraft gate parking locations to provide the direct simultaneous perpendicular parallel connections directly between the airport terminal building and multiple front and rear doors on the first side of the aircraft and simultaneously transferring passengers through the multiple front and rear doors of said aircraft parked in the parallel parking orientation.

5. The method of claim 4, further comprising automatically controlling extension and retraction of said extendible and retractable passenger loading bridges to provide the direct simultaneous perpendicular parallel connections to said multiple front and rear doors.

6. The method of claim 1, further comprising turning the aircraft 90° in the desired direction so that a first side or a second side of the aircraft with a cargo door faces away from the airport terminal building and servicing the aircraft from only the first or second side with the cargo door while simultaneously transferring passenger between the aircraft and the airport terminal building through the at least two perpendicular parallel extendible and retactable passenger loading bridges from the first or second side without the cargo door.

7. The method of claim 1, further comprising providing stairs at all front and rear doors located on the second side of the aircraft facing away from the airport terminal building and providing stairs at all front and rear doors on the first terminal-facing side of the aircraft not connected to the airport terminal building by the at least two perpendicular parallel passenger loading bridges.

8. A method for maximizing flexibility of airport gate operations and minimizing time required for gate operations at airports where aircraft are driven into and out of airport gate parking locations without operation of aircraft engines or attachment to tow vehicles and the airport gate parking locations are not equipped with passenger loading bridges, comprising:
   a. equipping aircraft driving into and out of gate parking locations at an airport with engines-off taxi systems comprising pilot-controllable landing gear wheel-mounted electric drive motors operable to drive the aircraft into and out of the gate parking locations and to turn the aircraft within the gate parking locations;
   b. providing a plurality of aircraft gate parking locations located adjacent to an airport terminal building and sized to provide at least a minimum clearance for the aircraft to be turned by the pilot with the electric drive motors at least 180° completely within the minimum clearance at each of the plurality of parking locations and providing a number of sets of portable stairs corresponding to a number of forward and rear doors on the aircraft without integral stairs to connect to the number of forward and rear aircraft doors on the aircraft for ground level passenger access into and out of aircraft parked at the plurality of gate parking locations;

c. driving an arriving aircraft by a pilot controlling the pilot-controllable electric drive motors in a forward direction into one of the plurality of parking locations, turning the aircraft 90° in a desired direction completely within the minimum clearance with the electric drive motors, and parking the arriving aircraft with a longest axis parallel to the aircraft terminal building with a first side or a second side of the aircraft facing the airport terminal building in a parallel parking orientation;

d. as soon as the aircraft is stopped, extending integral aircraft stairs and moving the number of portable stairs to the number of forward and rear doors without integral stairs on both the first side and the second side of the aircraft, and simultaneously transferring passengers between the aircraft and the airport terminal building through all of the aircraft forward and rear doors using the stairs while the aircraft is serviced; and e. at departure, removing the number of portable stairs from the number of forward and rear doors, controlling the electric drive motors by the pilot and driving the departing aircraft forward while turning the departing aircraft 90° with the electric drive motors completely within the minimum clearance so that a nose end is facing away from the airport terminal building and the longest axis is perpendicular to the airport terminal building, and continuing to control the electric drive motors by the pilot to drive the departing aircraft in only a forward direction away from the airport terminal building to a takeoff runway.

9. The method of claim 8, further comprising providing a set of integral aircraft stairs or portable stairs for each forward door and each rear door n on the first side and on the second side of said aircraft and directing transferring passengers leaving the aircraft to exit the aircraft through designated forward or rear doors and passengers boarding the aircraft to enter the aircraft through front forward or rear doors different from said designated forward or rear doors.

10. A method for improving safety and efficiency of aircraft traffic into and out of a plurality of airport terminal parking locations when aircraft are driven in only a forward direction into and out of the terminal parking locations without the hazards of jet blast or engine ingestion, comprising a. equipping aircraft with engines-off taxi systems comprising non-engine drive motors mounted within nose landing gear wheels and controllable by a pilot of the aircraft to drive and turn the aircraft into and out of airport terminal parking locations having a minimum clearance required for safely turning a nose end of the aircraft 90 degrees and 180 degrees completely within the parking location;

b. controlling the non-engine drive motors by the pilot and driving the aircraft in a forward direction into the parking location, turning the aircraft with the pilot-controlled non-engine drive motors, and parking the aircraft within the minimum clearance in a parking orientation that facilitates simultaneous passenger transfer and aircraft servicing in the parking location; and c. controlling the non-engine drive motors by the pilot and turning the aircraft nose end 90 degrees or 180 degrees with the non-engine drive motors completely within the parking location, then continuing to control the non-engine drive motors by the pilot and driving the aircraft in a forward direction out of the parking location and away from the airport terminal.

11. The method of claim 10, further comprising equipping a plurality of aircraft moving on the ground at the airport with the engines-off taxi systems, controlling said non-engine drive motors by the pilots of the plurality of aircraft and driving said plurality of aircraft in only a forward direction by controlling the non-engine drive motors to move the plurality of aircraft into and out of and to turn within the minimum clearance at the parking locations and then to takeoff runways.

* * * * *